United States Patent [19]

Holze

[11] Patent Number: 5,121,837
[45] Date of Patent: Jun. 16, 1992

[54] SELF-RECORDED PROGRAM INDEX SYSTEM AND METHOD INCLUDING TRANSPARENT HOLDER SECURED TO CARTON

[75] Inventor: Larry H. Holze, Des Plaines, Ill.

[73] Assignee: Charles F. Lind, Mt. Prospect, Ill.

[21] Appl. No.: 324,244

[22] Filed: Mar. 15, 1989

[51] Int. Cl.⁵ .................................................. B65D 85/67
[52] U.S. Cl. ...................................... 206/387; 40/159; 40/124.2
[58] Field of Search ................. 206/387, 459; 406/124, 406/124.2, 159, 585, 611, 488–490, 642, 594

[56] References Cited

U.S. PATENT DOCUMENTS

| | | | |
|---|---|---|---|
| 2,775,050 | 12/1956 | Ellsworth | 40/124.2 |
| 3,726,030 | 4/1973 | Wilson | 206/459 |
| 4,333,568 | 6/1982 | Weldin | 206/387 |
| 4,717,021 | 1/1988 | Ditzig | 206/387 |

FOREIGN PATENT DOCUMENTS

| | | | |
|---|---|---|---|
| 323308 | 1/1930 | United Kingdom | 40/159 |
| 48808 | 9/1988 | United Kingdom | 40/594 |

Primary Examiner—Kenneth J. Dorner
Assistant Examiner—James M. Gardner
Attorney, Agent, or Firm—Charles F. Lind

[57] ABSTRACT

A self-recorded program index system for a cassette tape stored in a carton, including a transparent holder secured relative to the carton and defining adjacent substantially equally-sized pockets. Index tabs are provided to be removably carried in the pockets, each pocket having a tab. To use, the lead tab would be removed from its pocket and marked with the first recorded program and reinserted into the lead pocket as the program tab for the first program. For any subsequent recorded program, the program tab for the program being recorded would be placed in the pocket after the indexing tab(s) for the last recorded program. By having an abundance of pockets, a specific minutes-per-pocket value could be set for each pocket, and each pocket could then correspond to an approximate specific time interval on the tape. If one program exceeded this value, the second and subsequent tab(s) immediately following its program tab could be left blank and in place, indicating the continuity of the recorded program, and the tab immediately following these tabs could be removed to leave an empty pocket, indicating the end of the recorded program.

4 Claims, 1 Drawing Sheet

SELF-RECORDED PROGRAM INDEX SYSTEM AND METHOD INCLUDING TRANSPARENT HOLDER SECURED TO CARTON

BACKGROUND OF THE INVENTION

Home video tapes can hold up to six hours of programming. On the other hand, most programs of interest, such as movies, that are taped with the intention to save for at least a month or more, may last between only one and three hours. Consequently, rather than leaving the rest of the tape unused, typically several nonrelated programs will be recorded on the same video tape, and at different times. Manual means must be used to keep track of what specific self-recorded programs are on each tape, and where.

One common indexing system provides for the video tape carton to have a table of contents format on one face, and another common indexing system provides for labels that can be stuck onto the video tape carton or directly on the video cassette. For either system, the person recording any program on the tape would have to list this program directly on the carton or on the stick-on labels.

However, human psychology generates a certain reluctance to write any indexing notation directly on the video tape carton or on a stick-on label, before the decision has been made to keep the recording. This decision cannot be made before reviewing the program. Moreover, since reviewing may be delayed until long after recording the program, many tapes end up in one's collection without any program indexing on them at all.

Known indexing systems thus seem to fail because of the human reluctance to use them in the first place, and/or consistently before or while the program is being recorded.

SUMMARY OF THE INVENTION

The main object of the present invention is to provide a reliable and highly visible system of indexing programs that are self-recorded on a video tape, utilizing disposable tabs that are furnished in excess abundance, to reduce any reluctance to index a program even before recording it, and a holder for the tabs adapted to be secured to the carton for holding the video cassette tape or possibly to the cassette itself.

The present invention may provide a multi-pocket transparent holder and a plurality of index tabs adapted to be fitted into the holder pockets, one tab for each pocket. The holder will typically have between six and twenty separate pockets. Thus, the programming time of the tape could be divided by the number of pockets, to give a minutes-per-pocket value. For example, with a six hour tape, each pocket of a six pocket holder would correspond to approximately sixty minutes of programming time; while each pocket of a twelve pocket holder would correspond to approximately thirty minutes of programming time.

The present invention may also provide a method of using the multi-pocket holder and index tabs, by removing the lead tab from its pocket and marking it with the listing identification of the first recorded program and by reinserting it into the lead pocket as the start tab of that program. After recording the first program, the method provides for removing the tab from the pocket immediately following the lapsed recorded program time from the start tab for that program, and leaving all tabs between the start tab and the emptied pocket in place and blank. When recording the second program, its start tab would be placed in the empty pocket after the first recorded program, and the length of the second program would locate the next pocket to be emptied. This method thus provides that a marked tab would identify the start of each program, the blank tabs following immediately thereafter would indicate the continunity of the identified program, and the empty pocket would indicate the approximate location of the end of the last recorded program and/or where to start recording the next program.

BRIEF DESCRIPTION OF THE DRAWINGS

Further objects, advantages and features of the present invention will appear from the following disclosure and description, including as a part thereof the accompanying drawings, in which.

DETAILED DESCRIPTION OF ILLUSTRATED EMBODIMENTS

Figure 1:
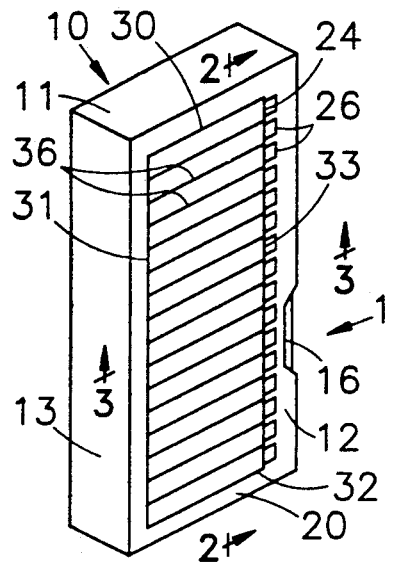
FIG. 1 is a perspective view of a typical carton having a video cassette tape contained therein, showing the inventive program indexing apparatus secured to the carton.

FIG. 1 illustrates a typical video tape carton 10, with three sides 11, 12 and 13 being exposed; where there are identical hidden sides provided opposite the exposed sides 11 and 12, while the hidden side opposite exposed side 13 is open. This provides that a video cassette tape 15 can be inserted into the open side of the carton, to become totally enclosed except for its own side, which closes the open carton side. As the actual construction of the carton 10 and cassette 15 form no part of the invention, details of each are not illustrated and in fact only a very small portion of the video cassette tape 15 can be seen at the gripping notch 16 provided in the carton side 12.

The invention provides locating a transparent multi-pocket holder 20 on the carton side 12, the holder defining separate elongated narrow pockets 22, each open only at end 24; and a plurality of index tabs 26 each adapted to be fitted into one of the pockets 22 at the open end 24, one tab for each pocket.

The holder 20 will be sized to overlie a large portion of the carton side 12. The tabs 26 will be sized to fit with slight clearance into the pockets 22. The illustrated tabs 26 are longer than the pockets 22, to leave exposed ends (see FIG. 1 for example) for gripping even when the tabs are fully inserted into the pockets. More tabs will be provided than the number of pockets in the holder.

Figures 2, 3:
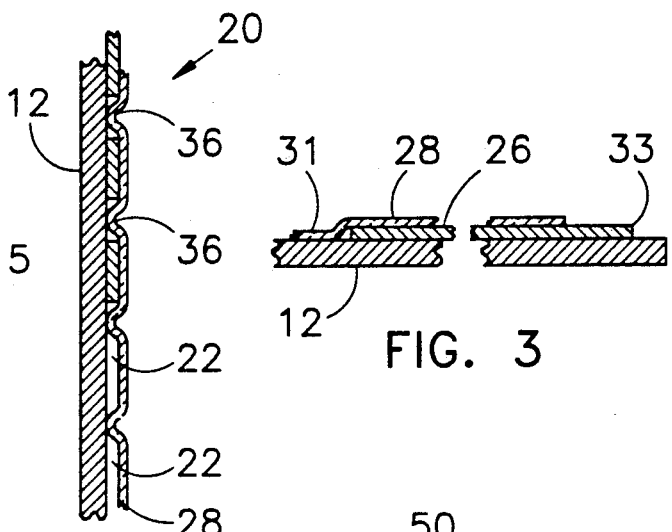
FIGS. 2 and 3 are enlarged fragmentary sectional views of the apparatus of FIG. 1, as seen generally from lines 2—2 and 3—3 therein.
Figure 4:
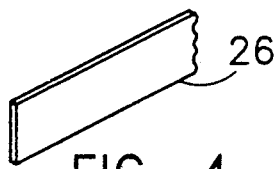
FIG. 4 is a perspective view of a single tab of the type to be used in the apparatus of FIG. 1.

The holder 20 illustrated in FIGS. 2 and 3 has a single layer 28 directly overlying the carton side 12, the layer and carton side being bonded together at the holder perimeter at edges 30, 31 and 32 but not along edge 33, and being bonded together also along narrow strips 36 generally parallel to one another and to the edges 30 and 32. This defines adjacent holder pockets 22 between the layer 28 and carton side 12, each closed on three edges and open at edge 33. The layer 28 illustrated is slightly contoured or bowed away from the carton side 12, between the strips 36, to provide that the pocket 22 has some three-dimensional definition even without a tab held therein, allowing the tab 26 to be easily inserted into the pocket. The layer 28 may be contoured by forming or stretching techniques, before or after it is adhered to the carton side, and may be somewhat stiff to hold its shape.

Figure 8:
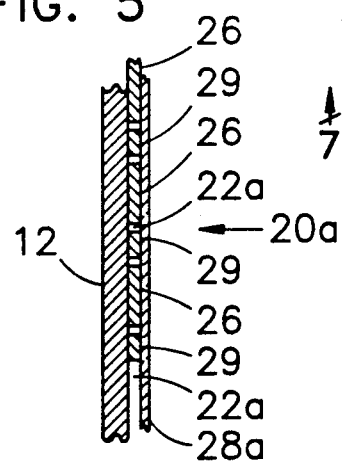
FIG. 8 is an enlarged fragmentary sectional view, similar to FIG. 2, but of an alternative construction of the apparatus.

FIG. 8 illustrates a similar holder 20a, except with the addition of a spacer layer 29 between the carton side 12 and the outer holder layer 28a. The spacer layer 29 would not be provided in the regions of the pockets 22a, but only in the regions along the perimeter holder edges 30, 31 and 32 (as illustrated in FIG. 1) and along the narrow bonding strips generally parallel to the perimeter edges 30 and 32, where the outer holder layer normally would be secured to the carton. The outer holder layer 28a would be bonded to one face of the spacer layer 29, and the opposite face of the spacer layer 29 would be bonded to the carton side 12. The thickness of the spacer layer 29 may be comparable to but typically less than the tab thickness. Even a substantially flat or noncontoured outer holder layer 28a can be spaced from the carton side 12 by the spacer layer 29, providing the three-dimensional pocket opening into which the tab 26 can be easily inserted.

Figure 6:
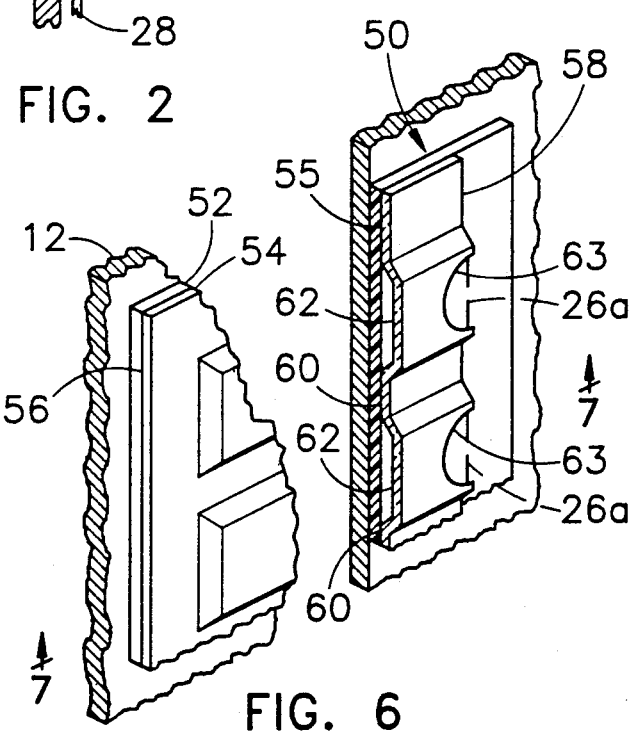
FIG. 6 is a perspective view, partly broken away and in section, of the front side wall of a typical carton for holding a video cassette tape therein, showing an alternative program indexing apparatus secured thereon.
Figure 7:
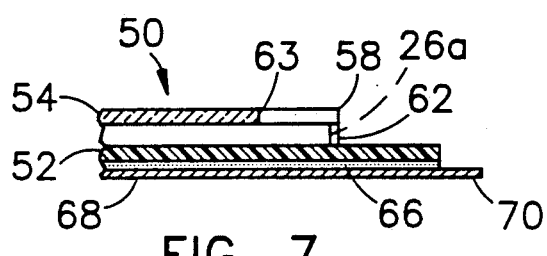
FIG. 7 is an enlarged fragmentary sectional view, as seen generally from line 7—7 in FIG. 6, showing additional details of the multi-pocket holder but before it is secured to the video tape carton.

The holder 50 of FIGS. 6 and 7 is illustrated as having layers 52 and 54, where layer 52 can be substantially flat and layer 54 can be shaped at the pockets in a manner similar to the holder sheet 28 illustrated in FIGS. 2 and 3. The layers 52 and 54 would be secured together along three adjacent perimeter edges (only secured perimeter edges 55 and 56 being shown in FIG. 6), and along narrow strips 60 generally parallel to the edge 55 and to one another; but not along the remaining fourth edge 58. The holder pockets 62 are thus defined between the layers 52 and 54, being open at edge 58.

The backing layer 52 may extend beyond edge 58 of the outer layer 54, allowing the tabs to be easily inserted into the holder pockets 62. The holder layer 54 is shaped with thumb cut-outs 63 in the region of the holder pockets. This exposes even a fully inserted tab (illustrated 26a in phantom in FIGS. 6 and 7) that may be approximately the same length or even slightly shorter than the holder pocket 62. The entire face of the backing layer 52 remote from the adjacent layer 54, could be bonded to the carton side.

The holder 50 of FIGS. 6 and 7 would be particularly suited for the secondary market, allowing a user to purchase it as a separate component independently of any video tape and to secure it onto an existing video carton 10 as needed. Adhesive 66 (see FIG. 7) would be coated on the face of the layer 52 remote from the adjacent layer 54, and a release sheet 68 would cover the adhesive. Edge 70 of the release sheet 68 could project beyond the adjacent layer 52 to serve as a gripping region for one to pull the release sheet off of the holder layer 52. Once the user removes the release sheet 68, he/she can press the adhesive face on the holder against the carton side 12 to attach the holder to the carton. The two-layer 52, 54 construction of the holder 50 would offer sufficient material weight and/or stiffness for ease of handling, while bonding over the full face of the layer 52 would provide firm attachment to the carton.

The holder constructions of FIGS. 2 and 3, and of FIG. 8 could also be offered independently in the secondary market, with a similar coating of adhesive on the local regions where bonding were to take place against the carton side 12 and with a release sheet 68 covering the adhesive. However, because of the reduced material weight and/or stiffness of the essentially single ply constructions and because of the reduced bonding area to the carton only in the regions along the edges 30, 31, 32 and between the pockets, these constructions might be more difficult for an inexperienced person to reliably secure onto the carton. On the other hand, these constructions would have great appeal to a carton manufacturer, who might secure them to the cartons for holding the video cassettes as the cartons are initially being made, to be distributed directly then to the user with the packaged video tape cassette.

Figure 5:
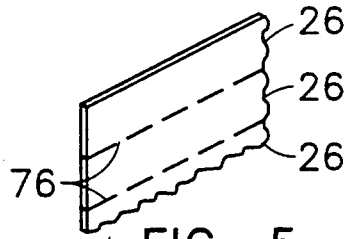
FIG. 5 is a perspective view of several tabs of the type to be used in the apparatus of FIG. 1, showing them secured together as in a pre-use fabricated stage.

The layer 28, 28a, 52, 54 may be of a transparent plastic, such as vinyl, acetate, mylar, polypropylene or the like, being of sufficient thickness to offer some stiffness and/or to avoid ripping or excessive stretching during use. The tabs 26 may be of heavy stock paper, manila, or the like to be relatively stiff, allowing them to be handled, written on, and inserted into the pockets 22, 22a, 62 without failing. The tabs 26 may be formed from a single sheet 75 (see FIG. 5) that is perforated along parallel lines 76, separated by the width of the tabs, to allow each tab to be pulled off the sheet as needed.

The holder 20, 20a, 50 should have at least six separate pockets, will preferably have between ten and twelve separate pockets, and could possibly have up to twenty separate pockets. The adjacent holder pockets are sequential, so that each pocket correspondes to an approximate specific time interval on the tape. For example, with a six hour tape, the holder would preferably have twelve pockets, to provide that each pocket would correspond to approximately thirty minutes of programing time. Because most tapes would be of a similar recording length and the thirty minute program would be quite common, a thiry minutes-per-pocket value probably could be used for all tapes in one's library. Also, as thirty minute commercial television programs are common, the minutes-per-pocket value should divide evenly into thirty, even if the holder has extra pockets or the tape is shorter than six hours. For example, a fifteen minutes-per-pocket value could be an alternative, using a sixteen pocket holder with a four hour tape.

All of the holder pockets are of substantially the same size; and all of the index tabs are of substantially the same size, slightly smaller than the pockets, to provide that the tabs may be interchanged and/or fitted into any of the pockets, without buckling, etc.

To use the multi-pocket holder and index tabs, the lead tab would be removed from its pocket, marked with the listing identification of the first recorded program, and reinserted into the lead pocket as the start tab of that first program. This should be done immediately upon starting to record, or when recording, the program; but certainly before the program has been recorded. After the program has been recorded and its overall recording length is known, the pocket that follows immediately after the lapsed recorded program time is determined, as measured from the start tab, and the tab is removed from this pocket and it is then left empty. All tabs between the start tab and the emptied pocket are left in place and blank.

After recording the first program of two-hour duration on a tape (when using the invention with a thirty minutes-per-pocket holder), the first program start tab would be in the first pocket; blank tabs would be in the second, third and fourth pockets; and the fifth pocket would be empty. When a second program were to be recorded, its start tab would be completed and inserted in the fifth pocket; and after its length were determined, counting off from its start tab in the fifth pocket, the tab in the pocket immediately following the lapsed time of the second program would be removed. If the second program were also a two-hour program, after indexing it, the fifth pocket would be holding the second program start tab; the sixth, seventh and eighth pockets would be holding blank tabs; and the ninth pocket would be empty.

This procedure provides positive visual identification of all recorded programs on any tape, with each marked index tab identifying its specific program, and with its sequential location in the holder indicating approximately where the program starts on the tape; the blank tabs following each marked index tab indicating the continunity of the identified program; and the empty pocket indicating where the last recorded program ends and where to start recording the next program. The same procedure could be followed when rerecording over any unwanted program. Inasmuch as more tabs will be provided than the number of the pockets in the holder, and as the tabs may be easily filled out and are disposable, the user can easily key him/herself to follow the procedure all of the time, even when recording programs of an "iffy" saving need. This will make the system very reliable and accurate.

It would be possible also to secure the holder directly onto the closed flat broad face of the tape cassette, opposite the face having the holes for receiving the spindles of the video recorder drive, instead of on the cassette carton. It would also be possible to identify specific program times on the start tabs, particularly should any recorded program be shorter than the minutes-per-pocket value normally used with the holder. This might be the situation for "programs" or "home movies" recorded on a portable video camera.

While only specific embodiments of the invention have been illustrated, it is apparent that variations may be made therefrom without departing from the inventive concept. Accordingly, the invention is to be limited only by the scope of the following claims.

What is claimed as my invention is:

1. A self-recorded program index system for a cassette tape stored in a side-open carton, comprising the combination of
   a holder secured to the carton on one broad side panel thereof and a plurality of index tabs adapted to be held in spaced adjacent orientation within the holder, arranged sequentially top-to-bottom of the side panel;
   said holder being formed as a layer of a transparent plastic, in a retangular shape, secured by adhesive directly to the carton side panel at local regions including
   substantially continuously along top, bottom and one side perimeter edges thereof but not along the opposite side perimeter edge thereof, and
   along narrow equally spaced intermediate strips generally parallel to one another and to the top and bottom edges,
   to define a plurality of substantially equal-size top-to-bottom sequentially adjacent pockets, each being elongated and open only at the opposite side edge of the holder;
   said index tabs being of substantially equal size, each having a cross-section slightly smaller than the pockets adapted to fit into any pocket; and even when the tab is fully inserted into the pocket, means providing an exposed tab end for gripping and easily removing the inserted tab from the pocket;
   the tabs being relatively stiff to allow them to be handled, written on, and inserted into the pockets without failing; and
   said holder layer being slightly contoured from the carton side panel, between the spaced secured regions, to provide that each pocket has a three-dimensional definition, and said layer being somewhat stiff to hold its three-dimensional shape so that each pocket remains open at the opposite side edge of the holder even when empty and without a tab being held therein, allowing the tab to be easily inserted into an empty pocket;
   whereby self-recorded programs may be identified on respective tabs, and the tabs may be stored in sequential pockets corresponding to each's order as sequentially recorded on the tape.

2. A self-recorded program index system for a cassette tape stored in a side-open carton, comprising the combination of
   a holder secured to the carton on one broad side panel thereof and a plurality of index tabs adapted to be held in spaced adjacent orientation within the holder, arranged sequentially top-to-bottom of the side panel;
   said holder being formed as a outer layer of a transparent plastic and a backing layer, disposed face to face and each being of a substantially retangular shape, the adjacent faces of said layers being secured together at spaced local regions including
   substantially continuously along top, bottom and one side perimeter edges thereof but not along the opposite side edge thereof, and
   along narrow equally spaced intermediate strips generally parallel to one another and to the top and bottom edges,
   to define between the layers a plurality of substantially equal-size top-to-bottom sequentially adjacent pockets, each being elongated and open only at one end at the opposite side edge of the holder;
   said index tabs being of substantially equal size, each having a cross-section slightly smaller than the pockets adapted to fit into any pocket; and even when the tab is fully inserted into the pocket, means providing an exposed tab end for gripping and easily removing the inserted tab from the pocket;
   the tabs being relatively stiff to allow them to be handled, written on, and inserted into the pockets without failing; and the backing layer being generally flat and being secured substantially over its entire opposite face by adhesive directly to and substantially flush against the one broad side panel of the carton;

said holder layer being slightly contoured from the flat and from the backing layer and carton side panel and having a three-dimensional definition between the spaced secured regions, to provide that each pocket remains open at the opposite side edge of the holder even when empty and without a tab being held therein, allowing the tab to be easily inserted into an empty pocket, and said layer being somewhat stiff to hold its three-dimensional shape;

whereby self-recorded programs may be identified on respective tabs, and the tabs may be stored in sequential pockets corresponding to each's order as sequentially recorded on the tape.

3. A self-recorded program index system according to claim 2, further comprising the combination of said backing layer being extended beyond said outer layer, at the opposite side edge of the holder, to have the adjacent pockets open at the one ends thereof over the backing layer and not directly over the carton side panel.

4. The method of indexing programs self-recorded on a cassette tape stored in a carton, comprising the steps of providing a transparent holder having at least six and up to twenty separate sequentially adjacent equal-size pockets, each dedicated to a specific programming time interval on the tape of either fifteen minutes or thirty minutes, and relatively stiff index tabs sized slightly smaller than and adapted to be removably carried in the pockets, one for each pocket;

of removing the lead tab from its pocket and marking it with the listing identification of the first recorded program and reinserting it into the lead pocket as the first program start tab;

of removing the tab from the pocket that follows immediately after the lapsed recorded program time from the first program start tab, and leaving this pocket empty, and of leaving all tabs between the first program start tab and the empty pocket in place and blank; and of redoing the above steps when recording the second and subsequent programs, except with the marked second or subsequent program start tab being placed in the empty pocket after the tabs of the last recorded program, and with the tab being removed from the pocket following immediately after the lapsed recorded program time of the second or subsequent program being counted off from the second or subsequent program start tab.

* * * * *